United States Patent [19]
Sardat

[11] Patent Number: 5,880,939
[45] Date of Patent: Mar. 9, 1999

[54] STABILIZED POWER SUPPLY CIRCUIT INCLUDING HYPERRESONANT CHOPPING AND SYNCHRONOUS RECTIFICATION

[75] Inventor: Pierre Sardat, Villemomble, France

[73] Assignee: Sinfor, Neuilly Sur Seine, France

[21] Appl. No.: 914,890

[22] Filed: Aug. 20, 1997

[30] Foreign Application Priority Data

Sep. 6, 1996 [FR] France ................................ 96 10899

[51] Int. Cl.$^6$ .................................................. H02M 3/335
[52] U.S. Cl. ............................................. 363/17; 363/98
[58] Field of Search ................................. 363/17, 41, 98, 363/127, 132

[56] References Cited

U.S. PATENT DOCUMENTS

| | | |
|---|---|---|
| 4,399,499 | 8/1983 | Butcher et al. . |
| 4,586,119 | 4/1986 | Sutton . |
| 4,857,822 | 8/1989 | Tabisz et al. . |
| 4,922,404 | 5/1990 | Ludwig et al. . |
| 4,953,068 | 8/1990 | Henze ........................................ 363/17 |
| 5,353,212 | 10/1994 | Loftus, Jr. ................................. 363/17 |
| 5,430,632 | 7/1995 | Meszlenyi ................................. 363/17 |
| 5,481,449 | 1/1996 | Kheraluwala et al. .................... 363/17 |
| 5,500,791 | 3/1996 | Kheraluwala et al. . |
| 5,541,827 | 7/1996 | Allfather .................................... 363/17 |
| 5,654,880 | 8/1997 | Brkovic et al. ............................ 363/17 |

*Primary Examiner*—Stuart N. Hecker
*Attorney, Agent, or Firm*—Griffin, Butler, Whisenhunt & Szipl, LLP

[57] ABSTRACT

The stabilized power supply circuit includes an inlet connected to a hyperresonant chopper circuit associated with a primary winding of a power transformer having at least one secondary winding associated with a rectifier circuit including electronic switches organized as a bridge and connected to a rectifier control circuit so as to be closed in alternation during current inversion in the primary winding of the power transformer and opened during voltage inversion at an inlet of the chopper circuit, it being possible also to provide regulation on one of the outlet circuits by means of a regulation loop connected to a control member of the chopper circuit.

4 Claims, 1 Drawing Sheet

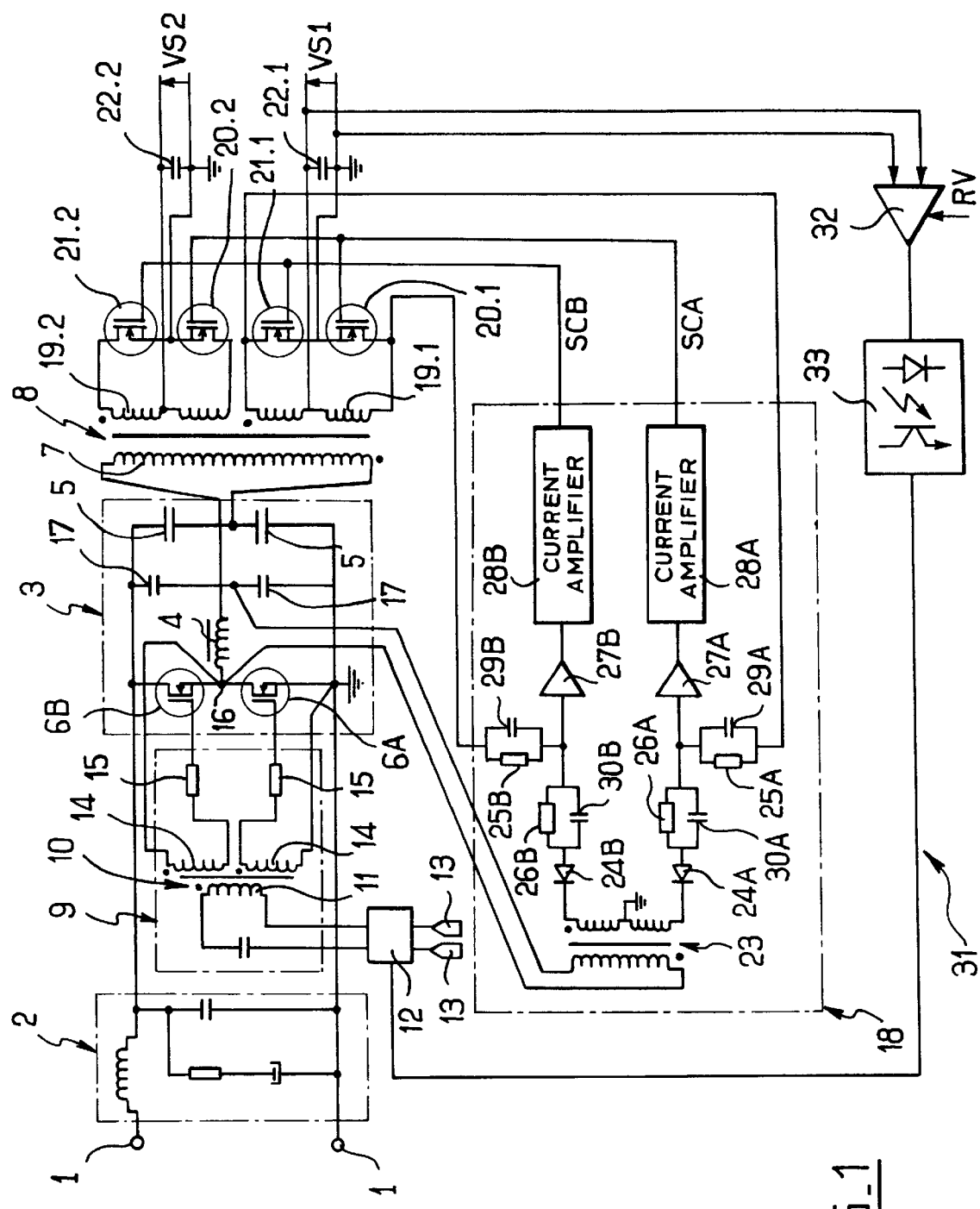
FIG_1

STABILIZED POWER SUPPLY CIRCUIT INCLUDING HYPERRESONANT CHOPPING AND SYNCHRONOUS RECTIFICATION

The present invention relates to a stabilized power supply circuit.

BACKGROUND OF THE INVENTION

Stabilized power supply circuits are known including an inlet connected to a hyperresonant chopper circuit associated with a primary winding of a power transformer having at least one secondary winding associated with a rectifier circuit whose outlet is connected via a regulation loop to a chopper circuit control member.

In known circuits, the rectifier circuit is an asynchronous circuit, i.e. a circuit including rectifier members, generally diodes, that operate automatically to perform switching on each alternation in the signal transmitted to the secondary of the power transformer so as to deliver a rectified signal to the output of the power supply circuit. In such circuits, switching of the rectifier members is accompanied with large amounts of energy dissipation and the efficiency of power supply circuits of that type is not very satisfactory. In addition, energy dissipation runs the risk of causing the components to become abnormally hot, so in order to provide cooling it becomes necessary to provide additional means that significantly increase the bulk and the weight of the power supply circuit.

Also, when the power supply circuit includes a plurality of outlets, each associated with a respective secondary winding of the power transformer, only one of the outlets can be connected via a regulation loop to the chopper circuit control member, with the other outlets being subject to "cross-regulation", i.e. to regulation that stems automatically from the regulation on the outlet including the regulation loop. Nevertheless, when performing asynchronous rectification, the rectifier members of the various outlets are impedances that vary as a function of the current passing through the rectifier members, so that such "cross-regulation" is provided with varying precision on different outlets. If it is desired to obtain the regulation of the same precision on all of the outlets, then it is necessary to provide independent regulation on each of the outlets, thus increasing the cost and the weight of the stabilized power supply circuit and reducing the efficiency thereof.

OBJECT AND BRIEF SUMMARY OF THE INVENTION

The invention seeks to mitigate the above drawbacks. To this end it provides a stabilized power supply circuit having an inlet connected to a hyperresonant chopper circuit associated with a primary winding of a power transformer having at least one secondary winding associated with a rectifier circuit having an outlet connected via a regulation loop to a control member for controlling the chopper circuit, in which the rectifier circuit includes electronic switches organized as a bridge and connected to a rectifier control circuit to be closed in alternation during current reversal in the primary winding of the power transformer and opened during voltage reversal at an inlet of the chopper circuit.

Thus, because of the precise control applied to the electronic switches by the rectifier control circuit, transient states are of short duration, thereby causing the efficiency of the power supply circuit to be very considerably increased. In addition, the offset between the switches opening and closing guarantees that two switches in a common bridge are never closed simultaneously.

Also, when in the closed position, the impedance of the electronic switches is very low and does not vary significantly as a function of the current flowing through them, such that when the power supply includes a plurality of outlets, the various outlets respond identically and regulating a single outlet by means of a regulation loop makes it possible to obtain substantially identical precision of regulation on all of the other outlets.

In an advantageous version of the invention, the current reversal in the primary winding of the power transformer is detected by variation in the voltage across the terminals of the secondary winding of the power transformer.

In a preferred embodiment of the invention, the rectifier control circuit includes an isolator member having a primary connected to the chopper circuit and a secondary having terminals connected to the output terminals of diodes connected in opposite directions, each diode having an input terminal connected firstly to one terminal of the secondary winding of the power transformer via resistors connected as a divider, and secondly to a threshold detector having an input connected to an intermediate point of the divider and an output connected to a control and electronic switch of the rectifier circuit. Preferably, the rectifier control circuit includes capacitors connected in parallel with the resistors constituting the divider.

BRIEF DESCRIPTION OF THE DRAWING

Other characteristics and advantages of the invention appear on reading the following description of a particular non-limiting embodiment of the invention given with reference to the sole accompanying FIGURE which is a circuit diagram of an embodiment of the stabilized power supply circuit of the invention.

MORE DETAILED DESCRIPTION

With reference to the FIGURE, the stabilized power supply circuit of the invention has an inlet comprising terminals 1 for connection to a non-stabilized DC power source such as a diode bridge. The inlet 1 is connected via an inlet filter given overall reference 2 to a hyperresonant chopper circuit given overall reference 3. The filter 2 is of conventional structure and is not described in detail. The chopper circuit 3 includes an inductor 4 coupled to capacitors 5 and to two electronic switches 6, in this case MOSFET transistors, in a half-bridge configuration. The two transistors 6 are identified more particularly in the FIGURE by references 6A and 6B. The outlet from the chopper circuit is associated with the primary winding 7 of a power transformer given overall reference 8. The primary winding 7 of the power transformer has one of its terminals connected to the inductor 4, while its other terminal is connected to an intermediate point between the capacitors 5.

The electronic switches 6 of the chopper circuit 3 are controlled by a chopper control circuit given overall reference 9. The chopper control circuit includes a control transformer 10 whose primary winding 11 is connected via a regulator member 12 whose purpose is explained below, to terminals 13 for feeding a squarewave chopper control signal. The transformer 10 also has two secondary windings 14 wound in the same direction with the adjacent ends thereof being respectively connected to the gates of the MOSFET transistors 6 via resistors 15 while the opposite ends of the windings 14 are respectively connected, one of them to ground and the other to an intermediate point 16 in a line connecting the drain of one of the MOSFET transistors whose source is connected to ground, to the source of the other MOSFET transistor whose drain is connected to the outlet of the inlet filter 2. The inductor 4 is also connected to the intermediate point 16 to form the half-bridge circuit.

The chopper circuit also comprises a capacitor bridge made up of the two capacitors 5. The chopper circuit also includes two capacitors 17 serving to take a voltage from between the intermediate point 16 between the electronic switches 6 and an intermediate point between the capacitors 17. The voltage taken in this way is an alternating voltage which is representative of voltage inversion at the inlet to the chopper circuit. This voltage is delivered to the input of a rectifier control circuit given overall reference 18 and whose detailed structure is described below.

In the embodiment shown, the power transformer 8 has two secondary windings, given overall numerical reference 19 and individual references 19.1 and 19.2, serving respectively to feed the two outlets VS1 and VS2 of the stabilized power supply circuit of the invention. Each of the secondary windings 19 is associated with a rectifier circuit. Each rectifier circuit includes two electronic switches, in this case MOSFET transistors, respectively given overall references 20 and 21, and specific references 20.1 and 21.1 for the outlet VS1, and 20.2 and 21.2 for the outlet VS2. In each rectifier circuit, the sources of the transistors 20 and 21 are interconnected while their drains are connected to opposite ends of the corresponding secondary winding, and the gates are connected to control outputs of the rectifier control circuit 18, respectively to control output SCA for transistors 20.1 and 20.2 and to control output SCB for transistors 21.1 and 21.2. The output voltage from each of the outputs is taken via a bridge circuit between the midpoint of the corresponding secondary winding 19 and an intermediate point between the sources of the corresponding transistors 20 and 21, which point is also connected to ground. A filter capacitor 22, comprising respective capacitors 22.1 and 22.2, is disposed between the output lines of each of the rectifier circuits.

The rectifier control circuit 18 includes an isolator member, in this case a transformer 23, having a primary winding connected to the chopper circuit 3 and a secondary winding having terminals connected to the output terminals of diodes 24, respectively referenced 24A and 24B that are connected in opposite directions, such that each diode 24 has an input connected to a terminal of the secondary winding 19.1 of the power transformer via resistors 25 and 26, and specifically via respective resistors 25A & 26A, and 25B & 26B connected in a divider configuration, and secondly to a threshold detector 27 specifically comprising detectors 27A and 27B each having its input connected to an intermediate point in the divider configuration and having its output connected to the corresponding output of the rectifier control circuit 18 via a respective current amplifier 28A or 28B. Capacitors 29 and 30, specifically 29A & 30A, and 29B & 30B are connected in parallel with the resistors 25 and 26 making up the divider configuration.

In addition, the power supply circuit includes a regulator loop given overall reference 31. This regulator loop comprises lines for taking the voltage from the output VS1 and connected to a comparator 32 having an input terminal for a reference voltage RV, the output from the comparator 32 being connected to an isolator member, in this case an optocoupler 33 connected to the regulator member 12 which delivers the control voltage to the control transformer 10 of the chopper circuit.

The operation of the circuit of the invention is described below starting from the situation in which the transistor 6A has just been switched off by a control signal from the control transformer 10 while the transistor 6B has been switched on after a dead period, the transistors 20.1 and 20.2 being conductive and thus forming closed electronic switches, while the transistors 21.1 and 21.2 are not conductive, and thus form open electronic switches.

The rising voltage which appears across the terminals of the transistor 6B is immediately transmitted to the transformer 23 of the rectifier control circuit, thus causing the diode 24B to stop conducting and causing the diode 24A to conduct. Conduction via the diode 24A resets the output SCA of the rectifier control circuit to zero such that the transistors 20.1 and 20.2 cease to conduct while the transistors 21.1 and 21.2 remain in the non-conductive state. This resetting to zero of the output SCA is accelerated by the disposition of the capacitors 29A and 30A.

After a short delay specific to the hyperresonant system, the current in the chopper circuit 3 reverses and in particular the current in the primary winding 7 of the power transformer 8 reverses. A rising front then appears at the terminal of the secondary winding 19.1 which is connected to the resistor 25B. The voltage at the intermediate point between the resistors 25B and 26B is a function of the voltage across the terminals of the secondary winding 19.1 and of the ratio of the resistances of these resistors. When the voltage at the intermediate point reaches a threshold determined by the threshold detector 27B, a signal appears at the output SCB of the rectifier control circuit 18. The transistors 21.1 and 21.2 are then caused to conduct while the transistors 20.1 and 20.2 remain non-conductive.

Thereafter, when the transistor 6B is switched off while the transistor 6A is switched on, the voltage at the primary of the transformer 23 of the control circuit 18 is reversed. This voltage reversal causes the diode 24B to conduct and simultaneously causes the diode 24A to become non-conductive, such that the output terminal SCB from the rectifier control circuit 18 is reset to zero, thereby causing the transistors 21 to become non-conductive again while the transistors 20 continue to be non-conductive. It is only when the current direction through the chopper circuit is revered after a delay relative to the transistor 6A being made conductive that a threshold voltage is detected by the threshold detector 27A which then feeds the output SCA, thus causing the transistors 20 to conduct.

It can thus be seen that the transistors 20 and 21 are caused to conduct in alternation without any risk of the transistors being caused to conduct simultaneously. Rectification is thus achieved without disturbing the alternating voltage delivered via the secondary windings of the power transformer 8.

During instants when the transistors 6, 20, and 21 are non-conductive, the residual current can flow via the parasitic diodes (not shown) of these transistors.

It will be observed that while they are conductive, the transistors 20 and 21 are of very low impedance such that the various outlet circuits have similar reaction, the voltage of each outlet circuit being determined by the dimensioning of the corresponding secondary winding 19 of the power transformer. Consequently, it suffices to ensure regulation on only one of the outlet circuits in order to achieve the same degree of precision for all of the outlet circuits. To this end, the comparator 32 of the regulation loop delivers a voltage error signal to the regulator member 12 which signal is then converted into a frequency and shaped prior to being transmitted to the primary of the control transformer 10 of the resonant chopper circuit.

Naturally, the invention is not restricted to the embodiment described above and variant embodiments come with the ambit of the invention as described by the claims.

In particular, although the circuit of the invention is described above with reference to a chopper circuit having a half-bridge, it is also possible to implement the circuit of the invention with a full-bridge chopper circuit without changing the rectifier control circuit.

Also, although the invention is shown using electronic switches in the form of MOSFETs, it would also be possible to use other electronic switches, where appropriate, by adapting the rectifier control circuit in corresponding manner.

I claim:

1. A stabilized power supply circuit having an inlet connected to a hyperresonant chopper circuit associated with a primary winding of a power transformer having at least one secondary winding associated with a rectifier circuit having an outlet connected via a regulation loop to a control member for controlling the chopper circuit, wherein the rectifier circuit includes electronic switches organized as a bridge and connected to a rectifier control circuit to be closed in alternation during current reversal in the primary winding of the power transformer and opened during voltage reversal at an inlet of the chopper circuit.

2. A power supply circuit according to claim 1, wherein the current reversal in the primary winding of the power transformer is detected by variation in the voltage across the terminals of the secondary winding of the power transformer.

3. A power supply circuit according to claim 2, wherein the rectifier control circuit includes an isolator member having a primary connected to the chopper circuit and a secondary having terminals connected to the output terminals of diodes connected in opposite directions, each diode having an input terminal connected firstly to one terminal of the secondary winding of the power transformer via resistors connected as a divider, and secondly to a threshold detector having an input connected to an intermediate point of the divider and an output connected to a control and electronic switch of the rectifier circuit.

4. A power supply circuit according to claim 3, wherein the rectifier control circuit includes capacitors connected in parallel with the resistors constituting the divider.

* * * * *